US012742082B2

(12) United States Patent
Nakashima et al.

(10) Patent No.: US 12,742,082 B2
(45) Date of Patent: Sep. 22, 2026

(54) PHOTOCURABLE INKJET PRINTING INK COMPOSITION

(71) Applicant: SAKATA INX CORPORATION, Osaka (JP)

(72) Inventors: Okinori Nakashima, Osaka (JP); Ryoichi Nitta, Osaka (JP); Koki Ogasahara, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 541 days.

(21) Appl. No.: 18/006,864

(22) PCT Filed: Jul. 21, 2021

(86) PCT No.: PCT/JP2021/027272
§ 371 (c)(1),
(2) Date: Jan. 25, 2023

(87) PCT Pub. No.: WO2022/030261
PCT Pub. Date: Feb. 10, 2022

(65) Prior Publication Data

US 2023/0279249 A1 Sep. 7, 2023

(30) Foreign Application Priority Data

Aug. 7, 2020 (JP) ................................ 2020-135005

(51) Int. Cl.
*C09D 11/101* (2014.01)
*C09D 11/107* (2014.01)
*C09D 11/32* (2014.01)
*C09D 11/322* (2014.01)

(52) U.S. Cl.
CPC .......... *C09D 11/107* (2013.01); *C09D 11/101* (2013.01); *C09D 11/32* (2013.01); *C09D 11/322* (2013.01)

(58) Field of Classification Search
CPC ..... C09D 11/107; C09D 11/101; C09D 11/32; C09D 11/322
USPC ........................................................ 524/131
See application file for complete search history.

(56) References Cited

U.S. PATENT DOCUMENTS

2008/0090929 A1 4/2008 Wilson et al.
2012/0270018 A1 10/2012 Mizutani et al.
2018/0147873 A1 5/2018 De Mondt et al.
2019/0062580 A1 2/2019 Nakashima et al.
2020/0270286 A1* 8/2020 Miyamoto ............ C07F 9/5337
2022/0041879 A1 2/2022 Nakashima et al.
2022/0073767 A1 3/2022 Harries et al.

FOREIGN PATENT DOCUMENTS

EP 3095614 A1 11/2016
GB 2561985 A 10/2018
GB 2562169 B 6/2021
JP 2012201815 A 10/2012
JP 2015030796 A 2/2015
JP 2019137735 A 8/2019
JP 2019151714 A 9/2019
WO 2008048533 A2 4/2008
WO 2017145671 A1 8/2017
WO 2020137067 A1 7/2020
WO 2020148441 A1 7/2020

OTHER PUBLICATIONS

Extended European Search Report (EESR) dated Aug. 20, 2024, issued for European counterpart patent application No. EP21852988.1 (5 pages).
International Preliminary Report on Patentability, dated Feb. 7, 2023, for corresponding international application PCT/JP2021/027272 (1 page).
Notification Concerning Transmittal of International Preliminary Report on Patentability, mailed Feb. 16, 2023, for corresponding international application PCT/JP2021/027272 (1 page).
Notification of Transmittal of Translation of the International Preliminary Report on Patentability, mailed Feb. 16, 2023, for corresponding international application PCT/JP2021/027272 (1 page).
Written Opinion of the International Searching Authority, mailed Oct. 12, 2021, for corresponding international application PCT/JP2021/027272 (4 pages).
International Search Report (ISR) mailed Oct. 12, 2021, issued for International application No. PCT/JP2021/027272. (2 pages).
A First Office Action issued by the State Intellectual Property Office of China on Aug. 31, 2023, with a search report, for Chinese counterpart application No. 202180060042.2 (6 pages).

* cited by examiner

*Primary Examiner* — Ruiyun Zhang
(74) *Attorney, Agent, or Firm* — Law Office of Katsuhiro Arai

(57) ABSTRACT

A photocurable inkjet printing ink composition satisfies all of requirements A to F: A: the total content of one or more compounds selected from vinyl methyl oxazolidinone, N,N-dimethylacrylamide, benzyl acrylate, and N-vinylcaprolactam is 30.0% by mass or higher; B: the total content of one or more compounds selected from saturated hydrocarbon group-containing monofunctional monomers with 6 or more carbon atoms and saturated hydrocarbon group-containing polyfunctional monomers with 6 or more carbon atoms is 15.0% by mass or higher; C: the content of bis(2,4,6-trimethylbenzoyl)phenylphosphine oxide is 2.5% by mass or lower; D: the content of ethoxy(2,4,6-trimethylbenzoyl)phenylphosphine oxide is 6.5 to 13.0% by mass; E: the content of amine-modified oligomer is 0.5 to 15.0% by mass; and F: as a colorant, a white pigment is contained by no more than 17.0% by mass, or not contained at all.

9 Claims, No Drawings

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2021/027272, filed Jul. 21, 2021, which claims priority to Japanese Patent Application No. JP2020-135005, filed Aug. 7, 2020. The International Application was published under PCT Article 21 (2) in a language other than English.

TECHNICAL FIELD

The present invention relates to a photocurable inkjet printing ink composition suitable for printing on, e. g., sheets whose printing face is constituted by a paper or resin such as vinyl chloride-based polymer and ethylene-vinyl acetate-based copolymer.

BACKGROUND ART

As described in Patent Literature 1, a photocurable inkjet ink composition containing 8 parts by mass of TPO-L and 1 part by mass of Irgacure 819 (herein also referred to as Omnirad 819 which is the new commercial name), along with tricyclodecanedimethanol diacrylate, is public knowledge.

As described in Patent Literature 2, a photocurable inkjet ink composition containing 6 parts by mass of TPO-L and 1 part by mass of Irgacure 819, along with N-vinylcaprolactam, isobornyl acrylate, and isodecyl acrylate, is public knowledge.

As described in Patent Literature 3, an inkjet ink composition containing 2 parts by mass of TPO-L and 6 parts by mass of Irgacure 819, along with N-vinylcaprolactam and isobornyl acrylate, as well as a photocurable inkjet ink composition containing 4 parts by mass of TPO-L and 2 parts by mass of Irgacure 819, along with polymerizable compounds, are public knowledge.

As described in Patent Literature 4, a photocurable inkjet ink composition containing 4.1 to 13.5 parts by mass of TPO-L and 1.4 to 6.4 parts by mass of Irgacure 819, along with N-vinylcaprolactam and isobornyl acrylate, is public knowledge.

One unique aspect of the inkjet method is that it accommodates a wide range of materials that can be utilized as base materials for printing, allowing printing on sheets of paper, polymer, metal, and other hard/soft materials with ease. Particularly for billboard ads that are installed outdoors, the performance requirements include being lightweight, exceptionally strong and durable, rain-resistant, and inexpensive; therefore, the ability to print on polymer sheets having these properties is of great advantage.

Additionally, in recent years, super-wide format inkjet printers have been introduced on the market that have a printing width of 2,000 mm or more, so as to allow, e.g., printing a large printed matter all at once that has been conventionally made by combining printed matters together by lamination, thereby making manufacturing of billboards easier and easier.

In general, tarpaulin is a frequent choice as a polymer sheet used for billboard ads. It should be noted that tarpaulin is a composite sheet comprising polyester or polyamide as a core material, with a polyvinyl chloride, ethylene-vinyl acetate-based copolymer or other vinyl-based polymer layered on the top and bottom thereof.

However, while photocurable inkjet ink compositions containing TPO-L and Irgacure 819 are known, as shown in Patent Literatures 1 to 4, inks are yet to be achieved that simultaneously offer excellent curability, tackiness, adhesion, abrasion resistance, water resistance, ethanol resistance, and banding resistance when printed on various types of resin base materials. In particular, efforts have so far fallen short of obtaining ink compositions that can prevent discoloration, such as yellowing, of high-brightness coating films and clear coating films made therewith. Furthermore, an art of considering the solubility of a photopolymerization initiator in a photocurable inkjet ink composition when considering the compositional makeup of the entire composition, is not known.

Also, the aforementioned photocurable inkjet printing ink compositions failed to satisfy these advanced requirements.

BACKGROUND ART LITERATURE

Patent Literature

Patent Literature 1: Japanese Patent Laid-open No. 2019-137735

Patent Literature 2: Japanese Patent Laid-open No. 2019-151714

Patent Literature 3: Japanese Patent Laid-open No. 2015-030796

Patent Literature 4: Japanese Patent Laid-open No. 2012-201815

SUMMARY OF THE INVENTION

Problems to be Solved by the Invention

An object of the present invention is to provide a photocurable inkjet printing ink composition that, subject to having a viscosity suitable for discharge, proves excellent in terms of curability, prevention of post-curing discoloration such as yellowing, tackiness (no tack) after curing, adhesion to various types of resin base materials, abrasion resistance, water resistance, ethanol resistance, and banding resistance.

Means for Solving the Problems

After studying in earnest to achieve the aforementioned object, the inventors of the present invention found that a specific compositional makeup would achieve the aforementioned object, and completed the present invention.

To be specific, the present invention is described below.

1. A photocurable inkjet printing ink composition satisfying all of requirements A to F below:

A: the total content of one or more types of compounds selected from vinyl methyl oxazolidinone, N,N-dimethylacrylamide, benzyl acrylate, and N-vinylcaprolactam is 30.0% by mass or higher in the photocurable inkjet printing ink composition;

B: the total content of one or more types of compounds selected from saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition;

C: the content of bis(2,4,6-trimethylbenzoyl)phenylphosphine oxide is 2.5% by mass or lower in the photocurable inkjet printing ink composition;

D: the content of ethoxy(2,4,6-trimethylbenzoyl)phenylphosphine oxide is 6.5 to 13.0% by mass in the photocurable inkjet printing ink composition;

E: the content of amine-modified oligomer is 0.5 to 15.0% by mass in the photocurable inkjet printing ink composition;

F: as a colorant, a white pigment is contained by no more than 17.0% by mass, or not contained at all, in the photocurable inkjet printing ink composition.

2. The photocurable inkjet printing ink composition according to 1, containing benzyl acrylate, as the compound specified in requirement A, by 16.0% by mass or more.

3. The photocurable inkjet printing ink composition according to 1 or 2, further satisfying requirement G below:

G: a brightness of a surface of the photocured coating film is 7.0 or higher.

4. The photocurable inkjet printing ink composition according to any one of 1 to 3, further satisfying requirement H below:

H: an optical transmittance of a surface of the photocured coating film is 70.0% or higher.

Effects of the Invention

The photocurable inkjet printing ink composition proposed by the present invention can demonstrate the effects of having low viscosity, excellent photopolymerization initiator solubility, no tackiness on cured film surfaces, excellent adhesion to various types of base materials, abrasion resistance, water resistance, and ethanol resistance, while preventing banding and discoloration of coating film, even when the composition is white or clear or has a highly bright color, or even when a colorant is contained.

MODE FOR CARRYING OUT THE INVENTION

The photocurable inkjet printing ink composition proposed by the present invention, which satisfies requirements A to F above, is explained below in order.

<Requirement A>

Requirement A states that the total content of one or more types of compounds selected from vinyl methyl oxazolidinone (5-methyl-3-vinyloxazolidin-2-one) (hereinafter also denoted as "VMOX"), N,N-dimethylacrylamide, benzyl acrylate, and N-vinylcaprolactam (hereinafter also denoted as "VCAP") is 30.0% by mass or higher in the photocurable inkjet printing ink composition. If the content is lower than 30.0% by mass, the coating film constituted by the photocurable inkjet printing ink composition will have lower adhesion to some base materials.

These compounds are liquid with relatively low viscosity at normal temperature and exhibit excellent inkjet printability. Additionally, other components in the photocurable inkjet printing ink composition may be dissolved or dispersed therein. They also have a property of excellent solubility with respect to the photopolymerization initiators described below. Furthermore, their excellent human safety profile makes these compounds easy to handle, and the cured coating film will have low odor, high curability, and high water resistance.

The total content of one or more compounds selected therefrom is preferably 32.0% by mass or higher, or more preferably 34.0% by mass or higher, in the photocurable inkjet printing ink composition. Meanwhile, it is preferably 50.0% by mass or lower, or more preferably 40.0% by mass or lower, in the photocurable inkjet printing ink composition.

Furthermore, preferably benzyl acrylate is contained in the photocurable inkjet printing ink composition, in which case the content of benzyl acrylate in the photocurable inkjet printing ink composition is preferably 16.0% by mass or higher, or more preferably 18.0% by mass or higher, or yet more preferably 20.0% by mass or higher, or most preferably 25.0% by mass or higher. Meanwhile, it is preferably 50.0% by mass or lower, or more preferably 40.0% by mass or lower, or yet more preferably 35.0% by mass or lower, or most preferably 30.0% by mass or lower.

Preferably vinyl methyl oxazolidinone, N,N-dimethylacrylamide, and N-vinylcaprolactam are used together with benzyl acrylate, while it is also preferable that benzyl acrylate is contained along with one type of these compounds, or benzyl acrylate is contained along with vinyl methyl oxazolidinone and N,N-dimethylacrylamide.

Meanwhile, it is more preferable that one or more types selected from vinyl methyl oxazolidinone, N,N-dimethylacrylamide, and N-vinylcaprolactam are contained so that their total content becomes lower than the content of benzyl acrylate.

<Requirement B>

Requirement B states that the total content of one or more types of compounds selected from saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition. The saturated hydrocarbon groups may be alkyl groups, alkylene groups, or groups having a ring structure, with 6 or more carbon atoms. If their content is 15% by mass or lower, curability, abrasion resistance, water resistance, alcohol resistance, and banding resistance will become poor.

Among these saturated hydrocarbon groups with 6 or more carbon atoms, those with 20 or fewer carbon atoms are preferred, while those with 15 or fewer carbon atoms are more preferred, and those with 12 or fewer carbon atoms are yet more preferred.

In total, the saturated hydrocarbon group-containing monofunctional monomers with 6 or more carbon atoms and saturated hydrocarbon group-containing polyfunctional monomers with 6 or more carbon atoms account for preferably 16.0% by mass or more, or more preferably 18.0% by mass or more, in the photocurable inkjet printing ink composition. Meanwhile, they account for preferably 30.0% by mass or less, or more preferably 25.0% by mass or less, in the photocurable inkjet printing ink composition.

It should be noted that "6 or more carbon atoms" in "hydrocarbon group-containing monofunctional (or polyfunctional) monomers with 6 or more carbon atoms" represent the number of carbon atoms only in the saturated hydrocarbon groups in these monomers.

(Saturated Hydrocarbon Group-Containing Monofunctional Monomers with 6 or More Carbon Atoms)

For the saturated hydrocarbon group-containing monofunctional monomers with 6 or more carbon atoms, isooctyl (meth)acrylate, tridecyl (meth)acrylate, 2-ethylhexyl (meth) acrylate, lauryl (meth)acrylate, stearyl (meth)acrylate, 2-ethylhexylcarbitol (meth)acrylate, isoamyl (meth)acrylate, isodecyl (meth)acrylate, isotetradecyl (meth)acrylate, isobornyl (meth)acrylate, etc., may be used. Among these, isobornyl acrylate is preferred.

(Saturated Hydrocarbon Group-Containing Polyfunctional Monomers with 6 or More Carbon Atoms)

For the saturated hydrocarbon group-containing polyfunctional monomers with 6 or more carbon atoms, 1,9-nonanediol di(meth)acrylate, neopentyl glycol di(meth) acrylate, hexanediol di(meth)acrylate, etc., may be used. Among these, hexanediol diacrylate is preferred.

<Requirement C>

Requirement C states that the content of bis(2,4,6-trimethylbenzoyl)phenylphosphine oxide is 2.5% by mass or lower in the photocurable inkjet printing ink composition. Also, it is preferably 2.0% by mass or lower, or more preferably 1.2% by mass or lower, or yet more preferably 1.0% by mass or lower. Or, it may not be contained.

If the content of bis(2,4,6-trimethylbenzoyl)phenylphosphine oxide exceeds 2.5% by mass, the coating film will yellow after curing, and when the coating film is white or clear or high in brightness, yellowing may affect the color of the coating film.

<Requirement D>

Requirement D states that the content of ethoxy(2,4,6-trimethylbenzoyl)phenylphosphine oxide is 6.5 to 13.0% by mass in the photocurable inkjet printing ink composition.

If the content of ethoxy(2,4,6-trimethylbenzoyl)phenylphosphine oxide is lower than 6.5% by mass in the photocurable inkjet printing ink composition, banding resistance, as well as curability, adhesion, abrasion resistance, water resistance, and ethanol resistance, will become poor. If the content exceeds 13.0% by mass, the coating film will yellow and have poor abrasion resistance and banding resistance.

In ratio by mass, preferably ethoxy(2,4,6-trimethylbenzoyl)phenylphosphine oxide/bis(2,4,6-trimethylbenzoyl) phenylphosphine oxide is 3.5 or higher. If it is lower than 3.5, surface curability, adhesion to some base materials, abrasion resistance, water resistance, and banding resistance of the coating film may become poor.

Ethoxy(2,4,6-trimethylbenzoyl)phenylphosphine oxide/ bis(2,4,6-trimethylbenzoyl)phenylphosphine oxide is more preferably 4.0 or higher, or yet more preferably 5.0 or higher, or most preferably 10.0 or higher, where 12.0 or higher is more superior.

It should be noted that 2,4,6-trimethylbenzoyl-diphenylphosphine oxide may not be used.

<Requirement E>

Requirement E states that the content of amine-modified oligomer is 0.5 to 15.0% by mass in the photocurable inkjet printing ink composition.

The amine-modified oligomers include acrylated amine compounds such as CN371, CN373, CN383, and CN386 (manufactured by Sartomer, Inc), each being an oligomer of an acrylated amine compound having two photopolymerizable functional groups and two amino groups in the molecule.

If the content of amine-modified oligomer in the photocurable inkjet printing ink composition is lower than 0.5% by mass, poor curability, adhesion, bending tolerance property, abrasion resistance, and banding resistance will result, while a content exceeding 15.0% by mass can make the photocurable inkjet printing ink composition too viscous or cause the photocurable inkjet printing ink composition to have unbalanced physical properties.

The content of amine-modified oligomer in the photocurable inkjet printing ink composition is preferably 1.0% by mass or higher, or more preferably 2.0% by mass or higher, or yet more preferably 3.0% by mass or higher, or most preferably 4.0% by mass or higher. Meanwhile, it is preferably 12.0% by mass or lower, or more preferably 10.0% by mass or lower, or yet more preferably 8.0% by mass or lower, or most preferably 7.0% by mass or lower.

<Other Photopolymerizable Monomers>

The photocurable inkjet printing ink composition proposed by the present invention may contain other monofunctional or polyfunctional photopolymerizable monomers besides the aforementioned monomers. It should be noted that such other photopolymerizable monomers may be used to the extent that the effects of the present invention are not impaired.

Among these photopolymerizable monomers, the monofunctional photopolymerizable monomers include benzyl methacrylate, butyl (meth)acrylate, ethyl carbitol (meth) acrylate, 2-methoxyethyl (meth)acrylate, 2-methoxybutyl (meth)acrylate, 4-hydroxybutyl (meth)acrylate, diethylene glycol monoethyl ether (meth)acrylate, ethoxydiethylene glycol (meth)acrylate, caprolactone (meth)acrylate, methoxytripropylene glycol (meth)acrylate, phenoxyethyl (meth)acrylate, EO (ethylene oxide)-modified succinic acid (meth)acrylate, and other monofunctional (meth)acrylates.

Others include acryloylmorpholine, acrylonitrile, acrylamide, diethylacrylamide, styrene, (meth)acrylic acid, etc.

These monofunctional photopolymerizable monomers may not be contained, but if they are contained, they account for preferably 5.0% by mass or more, or more preferably 10.0% by mass or more, or yet more preferably 15.0% by mass or more, in the photocurable inkjet printing ink composition. Meanwhile, they account for preferably 40.0% by mass or less, or more preferably 30.0% by mass or less, or yet more preferably 28.0% by mass or less, in the photocurable inkjet printing ink composition.

For the polyfunctional photopolymerizable monomers, which are compounds having multiple carbon-carbon unsaturated bonds in the molecule, the following compounds may be adopted, for example:

Vinyloxyethoxyethyl (meth)acrylate, ethylene glycol di(meth)acrylate, propylene glycol di(meth)acrylate, butanediol di(meth)acrylate, dipropylene glycol di(meth) acrylate, triethylene glycol di(meth)acrylate, tripropylene glycol di(meth)acrylate, and other (poly)alkylene glycol di(meth)acrylates, dimethylol-tricyclodecane di(meth)acrylate, hydroxypivalic acid neopentyl glycol di(meth)acrylate, polytetramethylene glycol diacrylate, trimethylolpropane tri (meth)acrylate, and ethylene oxide-modified products thereof, pentaerythritol tri(meth)acrylate, pentaerythritol tetra(meth)acrylate, and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, pentaerythritol ethoxy tetraacrylate, caprolactam-modified dipentaerythritol hexaacrylate, ethoxylated bisphenol A diacrylate, alkoxylated tetrahydrofurfuryl acrylate, etc.

These polyfunctional photopolymerizable compounds, or other photopolymerizable monomers, may not necessarily be contained, but if they are contained, their content is 1.0 to 10.0% by mass in the photocurable inkjet printing ink composition.

Acrylic-based resin may not be contained, but it may be contained to the extent that the effects of the present invention are not impaired, in the photocurable inkjet printing ink composition proposed by the present invention. Such acrylic-based resin may be a polymer comprising any (meth)

acrylate soluble in organic solvents, copolymer of such polymers, etc. Such (meth)acrylate may be, for example, ethyl, propyl, or butyl (meth)acrylate or other alkyl (meth) acrylate; hydroxymethyl, hydroxyethyl, hydroxypropyl, hydroxybutyl, or hydroxypentyl (meth)acrylate or other hydroxyalkyl (meth)acrylate, etc.

Examples include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.) manufactured by Mitsubishi Chemical Corporation, among others.

If acrylic-based resin is contained, the content of acrylic-based resin relative to the total amount of photocurable inkjet printing ink composition is preferably 1.0 to 5.0% by mass, or more preferably 1.5 to 4.0% by mass, or yet more preferably 2.0 to 3.0% by mass.

To the extent that the performance of the photocurable inkjet printing ink composition proposed by the present invention does not drop, resins other than the aforementioned acrylic-based resin, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, coumarone indene-based resin, terpen phenol-based resin, phenol resin, ketone resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be combined.

<Requirement F>

For use as the colorant, under requirement F, contained in the photocurable inkjet printing ink composition proposed by the present invention, preferably one is selected from the known organic coloring pigments and inorganic coloring pigments traditionally used in photocurable inkjet printing ink compositions. In particular, these include titanium oxide, zinc flower, zinc oxide, calcium carbonate, and other white pigments, as well as the below-mentioned coloring pigments other than white pigments.

To better demonstrate the effect of the present invention to prevent discoloration such as yellowing, preferably the photocurable inkjet printing ink composition is a white ink composition containing any of the aforementioned white pigments. When the present invention is prepared as a white ink composition, preferably the content of white pigment is 5 to 17.0% by mass in the photocurable inkjet printing ink composition. It is also preferable that the present invention is a clear ink composition that does not contain any coloring pigment or dye, but contains an extender pigment as necessary. Additionally, it may be a photocurable inkjet printing ink composition that forms a coating film susceptible to a change in development of color due to yellowing, such as one which forms a coating film that is colored but offers low concealability or whose coating film has high brightness.

Specific examples of organic coloring pigments include azo-based, azomethine-based, polyazo-based, phthalocyanine-based, quinacridone-based, anthraquinone-based, indigo-based, thioindigo-based, quinophthalone-based, benzimidazolone-based, isoindoline-based, isoindolinone-based, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

An organic coloring pigment may not be contained in the ink composition proposed by the present invention, but if it is contained, preferably its content is 0.1 to 10.0% by mass, according to the desired degree of development in color, in the photocurable inkjet printing ink composition.

(Other Inorganic Coloring Pigments or Extender Pigments)

Examples of other inorganic coloring pigments and extender pigments include lithopone, iron oxide, silicon dioxide, kaolinite, montmorillonite, talc, barium sulfate, silica, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

Any one type of these pigments may be used alone, or two or more types may be combined to the extent that the effects of the present invention are not impaired, where, if used, the amount used is 0.5 to 10.0% by mass, or more preferably 2.0 to 7.0% by mass, relative to the total amount of photocurable inkjet printing ink composition. If the amount of pigment used is less than 0.5% by mass, the coloring strength tends to be insufficient, while an amount exceeding 10.0% by mass tends to cause the viscosity to rise and ink fluidity to drop.

It should be noted that, while any white pigment, particularly titanium oxide, etc., may be used together with other coloring pigments, it is necessary that it, if used, will not impair the effects of the present invention. Also, titanium oxide or other white pigment may not be contained.

(Pigment Dispersant)

The pigment dispersants that may be contained in the photocurable inkjet printing ink composition proposed by the present invention, if the composition contains a pigment, include ionic or nonionic surfactants, and anionic, cationic, or nonionic high-molecular compounds, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 56000 (manufactured by The Lubrizol Corporation), SOLSPERSE 32000 (manufactured by The Lubrizol Corporation), SOLSPERSE 39000 (manufactured by The Lubrizol Corporation), DISPERBYK (manufactured by BYK-Chemie Japan K.K.), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

<Requirement G>

The coating film obtained by solid printing using the photocurable inkjet printing ink composition proposed by the present invention will demonstrate the effects so long as the coloration of the ink composition is at normal level. To demonstrate superior effects, however, its surface brightness is preferably 4.0 or higher, or more preferably 7.0 or higher, or yet more preferably 8.5 or higher.

The higher the brightness as denoted above, the more susceptible the color of the coating film is to coloration or discoloration over time due to components other than the colorant.

This means that the effects of the compositional makeup, particularly adoption of requirements C and D, of the photocurable inkjet printing ink composition proposed by the present invention can be demonstrated more prominently.

<Requirement H>

The coating film obtained by solid printing using the photocurable inkjet printing ink composition proposed by the present invention will demonstrate the effects so long as the ink composition is such that the optical transmittance of the coating film surface is at normal level. To demonstrate superior effects, however, the transmittance of the coating film is preferably 70.0% or higher, or more preferably 80.0% or higher, or yet more preferably 90.0% or higher. In this case, the coating film may be chromatic or achromatic.

The transmittance of the coating film is obtained using the formula below by measuring the intensity I of the transmitted light obtained by vertically irradiating a white light of intensity $I_o$ onto the coating film surface of a sample being a cured coating film which is formed on a clear glass and whose film thickness before curing was 100 μm:

$$\text{Transparency(optical transmittance)} = (I/I_o) \times 100$$

The higher the transmittance as denoted above, the more susceptible the color of the coating film is to coloration or discoloration over time due to components other than the colorant.

This means that the effects of the compositional makeup, particularly adoption of requirements C and D, of the photocurable inkjet printing ink composition proposed by the present invention can be demonstrated more prominently.

(Organic Solvent)

The photocurable inkjet printing ink composition proposed by the present invention may be of a so-called nonsolvent type in which all liquid components undergo curing reaction to be solidified, or of a solvent type in which the printed coating film is dried to remove solvent and then cured. It should be noted that water is not used as a solvent.

The following describes a case where the photocurable inkjet printing ink composition proposed by the present invention contains an organic solvent.

The organic solvents that may be contained in the photocurable inkjet printing ink composition proposed by the present invention include propylene carbonate, diethylene glycol dialkyl ether, dipropylene glycol alkyl ether acetate, etc.

For the diethylene glycol dialkyl ether, preferably diethylene glycol ethyl methyl ether and/or diethylene glycol diethyl ether is/are used, or any other diethylene glycol dialkyl ether may also be combined.

For the dipropylene glycol alkyl ether acetate, preferably one containing an alkyl group with 6 or fewer carbon atoms, or more preferably one containing an alkyl group with 3 or fewer carbon atoms, or yet more preferably one containing an alkyl group with 2 or fewer carbon atoms, may be adopted.

Additionally, besides diethylene glycol dialkyl ether, an alkylene glycol derivative with a flash point of 50 to 150° C. may also be combined in order to adjust drying property and further improve anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether, and other (poly)ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, diethylene glycol monoethyl ether acetate, diethylene glycol monobutyl ether acetate, diethylene glycol monopropyl ether acetate, triethylene glycol monoethyl ether acetate, triethylene glycol monobutyl ether acetate, and other (poly)ethylene glycol monoether monoesters.

Among the alkylene glycol derivatives with a flash point of 50 to 150° C., diethylene glycol ethyl methyl ether and diethylene glycol diethyl ether are called to attention first.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C., may also be combined.

(Sensitizer)

In the photocurable inkjet printing ink composition proposed by the present invention, a photosensitizer (compound) that has light absorbing properties primarily in the ultraviolet ray wavelength range of 400 nm and higher and manifests a function to sensitize the curing reaction under light having the wavelengths in this range, may also be used together with the polymerization initiators, to promote curability under ultraviolet ray from a light-emitting diode (LED) light source.

Such sensitizer may be an anthracene-based sensitizer, thioxanthone-based sensitizer, etc., where a thioxanthone-based sensitizer is preferred. Any of these sensitizers may be used alone, or two or more types may be used together. Specific examples include 9,10-dibutoxyanthracene, 9,10-diethoxyanthracene, 9,10-dipropoxyanthracene, 9,10-bis(2-ethylhexyloxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include DBA and DEA (manufactured by Kawasaki Kasei Chemicals Ltd.) for anthracene-based sensitizers, and DETX and ITX (manufactured by Lambson Ltd.) for thioxanthone-based sensitizers, and the like.

Preferably the content of sensitizer is in a range of 0 to 8.0% by mass relative to the total mass of photopolymerizable components. A content exceeding 8.0% by mass is not desirable because it represents an excessive addition that no longer leads to improvement in effects.

It should be noted that, if a thioxanthone-based sensitizer is used as the sensitizer, the photocurable inkjet printing ink composition tends to yellow and take on a hue that is yellower than the color based on the pigment, etc. (inherent hue), and therefore preferably the content of such thioxanthone-based sensitizer is determined as deemed appropriate for each color.

To be specific, preferably white ink compositions and clear ink compositions that are more easily affected by a change in color tone do not contain any thioxanthone-based compound as the sensitizer. Also, preferably magenta ink compositions and cyan ink compositions that present problems if a change in hue occurs use such compound only to the extent that doing so does not cause problems with the hue. Also, preferably black ink compositions and yellow ink compositions use a thioxanthone-based compound as the sensitizer because their hue is not affected by a color change and their photopolymerizability is lower compared to ink compositions of other hues.

(Other Components)

Furthermore, in the photocurable inkjet printing ink composition proposed by the present invention, various additives such as surfactants, plasticizers, polymerization inhibitors, surface conditioners, ultraviolet protective agents, photostabilizers, and antioxidants may be used as necessary.

(Viscosity of Photocurable Inkjet Printing Ink Composition)

The photocurable inkjet printing ink composition proposed by the present invention has a viscosity at 25° C. of preferably 30.0 mPa·s or lower, or more preferably 20.0 mPa·s or lower, or yet more preferably 10.0 mPa·s or lower, or most preferably 8.0 mPa·s or lower. If the viscosity exceeds 30.0 mPa·s, discharge of the ink composition from inkjet printing nozzles may become difficult.

It should be noted that this viscosity represents the viscosity measured under the conditions of 25° C. and 20 rpm using a type-E viscometer (product name: RE100L Viscometer, manufactured by Toki Sangyo Co., Ltd.).

(Manufacturing of Photocurable Inkjet Printing Ink Composition)

Next, how the photocurable inkjet printing ink composition proposed by the present invention is manufactured using these materials is explained.

The photocurable inkjet printing ink composition proposed by the present invention can be obtained by dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, for example, and adjusting the viscosity of the photocurable inkjet printing ink composition to between 2 and 10 mPa·s.

Preferably the content of all organic solvents in the photocurable inkjet printing ink composition proposed by the present invention, which is the total amount of ink composition less the total sum of the amounts of solids content as well as other additives used as necessary, is changed as deemed appropriate so as to bring the ink viscosity into the aforementioned range.

The thus obtained photocurable inkjet printing ink composition proposed by the present invention can be used with inkjet printers on base materials whose top-face layer at least is constituted by a paper or resin such as vinyl chloride-based polymer and ethylene-vinyl acetate-based copolymer.

(Applications)

The photocurable inkjet printing ink composition proposed by the present invention can be used in known applications using paper base materials, among which it is particularly suited for situations where abrasion resistance is required, and the ink composition is used on top-face layers of nonabsorbent base materials. Nonabsorbent materials are not limited to metals, resins, ceramics, etc., but preferably the ink composition is used on top face-layers of resin base materials, or more strictly on top-face layers where this resin is constituted by a vinyl chloride-based polymer or ethylene-vinyl acetate-based copolymer or by vinyl chloride resin, polyethylene terephthalate, polycarbonate, etc., from the viewpoint of water resistance, etc. Also, from the viewpoint of adhesion, etc., preferably it is used on top-face layers where the resin is constituted by polyethylene terephthalate (PET), vinyl chloride resin, polycarbonate, tarpaulin, acrylic-based resin, etc.

The method for printing and curing the photocurable inkjet printing ink composition proposed by the present invention may specifically be a method whereby the photocurable inkjet printing ink composition proposed by the present invention is discharged onto a base material from an inkjet head, after which the coating film of the ink composition proposed by the present invention that has landed on the base material is exposed to light and thereby cured.

For example, discharge onto the base material (printing of images) may be implemented by supplying the photocurable inkjet printing ink composition proposed by the present invention to a low-viscosity-compatible printer head of an inkjet recording printer, and then discharging the ink composition from the printer head in such a way that the coating film on the base material will have a film thickness of 1 to 60 μm, for example. Also, exposure to light and curing (curing of images) may be implemented by irradiating light onto the coating film of the photocurable inkjet printing ink composition proposed by the present invention that has been applied on the base material as images.

For the inkjet recording printer device with which to print the photocurable inkjet printing ink composition proposed by the present invention, any traditionally-used inkjet recording printer device may be utilized. It should be noted that, if a continuous-type inkjet recording printer device is used, a conductivity-imparting agent is further added to the photocurable inkjet printing ink composition proposed by the present invention to adjust its conductivity.

The light source in the aforementioned curing of the coating film may be ultraviolet ray (UV lamp), ultraviolet ray (light-emitting diode (LED)), electron beam, visible light, etc., where a light-emitting diode (LED) that generates ultraviolet ray with an emission peak wavelength in a range of 350 to 420 nm is preferred from an environmental aspect.

Ultraviolet ray from a light-emitting diode (LED) light source refers to "light irradiated from a light-emitting diode that generates ultraviolet ray with an emission peak wavelength in a range of 350 to 420 nm."

EXAMPLES

The present invention is explained in greater detail below by citing examples, but the present invention is not limited to these examples. It should be noted that, unless otherwise specified, "%" and "part" refer to "% by mass" and "part by mass," respectively.

The materials used in the following Examples and Comparative Examples are listed below. In the Table, the unit of values in the fields relating to pigments, dispersants, resins, solvents, and totals is "% by mass."

Also, in the Table, "photopolymerizable compound A" represents a compound that is blended in according to requirement A under the present invention, and similarly "photopolymerizable compound B" represents a compound that is blended in according to requirement B under the present invention.

(Amine-Modified Oligomer)

CN371 (manufactured by Sartomer, Inc.)

(Photopolymerization Initiators)

TPOL: Ethoxy (2,4,6-trimethylbenzoyl)phenylphosphine oxide

Omnirad 819 (herein also referred to as Irgacure 819 which is the former commercial name): Bis(2,4,6-trimethylbenzoyl)phenylphosphine oxide TPO: 2,4,6-trimethylbenzoyl-diphenyl-phosphine oxide (manufactured by Lambson Ltd.)

(Sensitizer)

DETX: Diethyl thioxanthone (manufactured by Lambson Ltd.)

(Polymerization Inhibitor)

UV-5: Dioctyl maleate (manufactured by Kromachem Ltd.)

(Surface Conditioner)

BYK-315N: Polyester-modified polymethylalkylsiloxane surfactant of 25% by mass in solids content, whose solvent component is a 1/1 mass ratio mixture of methoxypropyl acetate and phenoxyethanol (manufactured by BYK-Chemie GmbH)

(Colorant (Pigment))

P.W.6: Pigment White 6

(Pigment Dispersant)

AJISPER PB821 (manufactured by Ajinomoto Fine-Techno Co., Inc.)

Examples 1 to 6 and Comparative Examples 1 to 7

<Manufacturing of Photocurable Inkjet Printing Ink Compositions)

The materials were mixed under agitation according to the formulations in Table 1 (blending ratios of the materials are expressed in % by mass), to obtain the photocurable inkjet printing ink compositions in the Examples and Comparative Examples.

<Evaluation Methods and Evaluation Criteria>

The base materials for evaluation shown in Table 1 are listed below:

PET: Polyethylene terephthalate (LUMIRROR, manufactured by Toray Industries, Inc.)

PC: Polycarbonate (IUPILON Sheet FE2000, manufactured by Mitsubishi Engineering-Plastics Corporation)

PVC: Polyvinyl chloride (PVC80, manufactured by LINTEC Corporation)

(Viscosity of Ink Composition)

The photocurable inkjet printing ink compositions obtained in the Examples and Comparative Examples were measured for viscosity using a type-E viscometer (product name: RE100L Viscometer, manufactured by Toki Sangyo Co., Ltd.) under the conditions of 25° C. in temperature and 20 rpm in rotating speed.

(Coating Film Yellowing Property)

The photocurable inkjet printing ink compositions obtained in the Examples and Comparative Examples were each printed on the surface of a PVC film using a commercially-available inkjet printer and then irradiated with an ultraviolet ray of 1500 mJ/cm$^2$, to obtain a cured coating film.

The obtained coating film was measured for color under the conditions of D50 light source and 2° observation field using SpectroEye (manufactured by X-Rite, Inc.) and the b-value was evaluated according to the evaluation criteria below:

○: Lower than 2.

Δ: 2 or higher but lower than 3.

x: 3 or higher.

(Curability)

The photocurable inkjet printing ink compositions obtained in the Examples and Comparative Examples were each printed on the surface of a PVC film using a commercially-available inkjet printer and then irradiated with an ultraviolet ray of 1500 mJ/cm$^2$, to obtain a cured coating film.

The obtained coating film was rubbed with a cotton swab and curability was evaluated based on whether or not marks are left, and by touch, according to the evaluation criteria below:

○: No marks are left and there is no stickiness.

Δ: No marks are left, but there is some stickiness.

x: Marks are left and there is significant stickiness.

(Adhesion)

The photocurable inkjet printing ink compositions obtained in the Examples and Comparative Examples were each applied on the surfaces of various types of base materials (PET, PC, PVC) using Bar Coater No. 4 and then irradiated with an ultraviolet ray of 1500 mJ/cm$^2$ in the case of an Example, or irradiated with ultraviolet ray until the ink composition was completely cured in the case of a Comparative Example, to obtain cured coating films.

The obtained coating films were each evaluated for CELLOTAPE (registered trademark) adhesion according to the evaluation criteria below:

○: The coating film does not separate.

x: The coating film separates.

(Bending Tolerance Property)

The photocurable inkjet printing ink compositions obtained in the Examples and Comparative Examples were each applied on one side of a PVC film using Bar Coater No. 12 and then irradiated with an ultraviolet ray of 1500 mJ/cm$^2$ in the case of an Example, or irradiated with ultraviolet ray until the ink composition was completely cured in the case of a Comparative Example, to obtain a cured coating film.

The PVC film was bent by 180 degrees with the obtained coating film facing outward and the condition of the coating film was visually inspected to evaluate the bending tolerance property according to the evaluation criteria below:

○: The coating film is not cracked.

x: The coating film is cracked.

(Abrasion Resistance)

The photocurable inkjet printing ink compositions obtained in the Examples and Comparative Examples were each applied on the surface of a PVC film using Bar Coater No. 6 and then irradiated with an ultraviolet ray of 1500 mJ/cm$^2$ in the case of an Example, or irradiated with ultraviolet ray until the ink composition was completely cured in the case of a Comparative Example, to obtain a cured coating film.

The obtained coating film was put through a Gakushin color fastness tester to rub the colored coating film 100 times with a black bleached cloth under a load of 500 g at a speed of 60 rpm, to evaluate the degree of separation of the coating film, as well as the degree of color transfer to the black bleached cloth, according to the evaluation criteria below:

○: Color transfer did not occur, or color transfer covering less than 5% of the area of the cloth occurred.

Δ: Color transfer covering 5% or more but less than 70% of the area of the cloth occurred.

x: Color transfer covering 70% or more of the area of the cloth occurred.

(Water Resistance)

The photocurable inkjet printing ink compositions obtained in the Examples and Comparative Examples were each applied on the surface of a PVC film using Bar Coater No. 6 and then irradiated with an ultraviolet ray of 1500 mJ/cm$^2$ in the case of an Example, or irradiated with ultraviolet ray until the ink composition was completely cured in the case of a Comparative Example, to obtain a cured coating film.

The obtained coating film was put through a Gakushin color fastness tester to rub the colored coating film 100 times with a black bleached cloth moistened with 5 drops of water, under a load of 500 g at a speed of 30 rpm, to evaluate the degree of separation of the coating film, as well as the degree of color transfer to the black bleached cloth, according to the evaluation criteria below:

○: Color transfer did not occur, or color transfer covering less than 5% of the area of the cloth occurred.

Δ: Color transfer covering 5% or more but less than 70% of the area of the cloth occurred.

x: Color transfer covering 70% or more of the area of the cloth occurred.

(Ethanol Resistance)

The photocurable inkjet printing ink compositions obtained in the Examples and Comparative Examples were each applied on the surface of a PVC film using Bar Coater No. 6 and then irradiated with an ultraviolet ray of 1500 mJ/cm$^2$ in the case of an Example, or irradiated with ultraviolet ray until the ink composition was completely cured in the case of a Comparative Example, to obtain a cured coating film.

The obtained coating film was put through a Gakushin color fastness tester to rub the colored coating film 10 times with a black bleached cloth moistened with 5 drops of 70% aqueous ethanol solution, under a load of 200 g at a speed of 30 rpm, to evaluate the degree of separation of the coating film, as well as the degree of color transfer to the black bleached cloth, according to the evaluation criteria below:

○: Color transfer did not occur, or color transfer covering less than 30% of the area of the cloth occurred.

Δ: Color transfer covering 30% or more but less than 70% of the area of the cloth occurred.

x: Color transfer covering 70% or more of the area of the cloth occurred.

(Banding Resistance)

The photocurable inkjet printing ink compositions obtained in the Examples and Comparative Examples were each applied on the surface of a PVC film using a commercially-available inkjet printer and then irradiated with an ultraviolet ray of 1500 mJ/cm$^2$, to obtain a cured coating film.

The obtained coating film was measured for glossiness at a measuring angle of 60° using a variable-angle gloss meter (product name: GlossMeter VG7000, manufactured by Nippon Denshoku Industries Co., Ltd.) to evaluate banding resistance according to the evaluation criteria below:

○: The measured value is 15.0 or higher.

Δ: The measured value is 10.0 or higher but lower than 15.0.

x: The measured value is lower than 10.0.

TABLE 1

| | | Examples | | | | | |
|---|---|---|---|---|---|---|---|
| | | 1 | 2 | 3 | 4 | 5 | 6 |
| Amine-modified oligomer | CN371 | 2.00 | 2.00 | 2.00 | 2.00 | 5.00 | 5.00 |
| Photo-polymerizable compounds A | VMOX | | 7.50 | | | | |
| | N,N-dimethylacrylamide | 7.50 | | 7.50 | 7.50 | 7.50 | |
| | Benzyl acrylate | 25.42 | 28.42 | 25.42 | 32.42 | 23.50 | 23.50 |
| | Vinylcaprolactam | | | | | | 7.50 |
| Photo-polymerizable compounds B | Hexanediol diacrylate | 20.00 | 18.00 | 15.00 | 15.00 | 20.00 | 16.00 |
| | Isobornyl acrylate | | | 5.00 | | | 4.00 |
| Other photo-polymerizable compounds | Acryloylmorpholine | 10.00 | 10.00 | 10.00 | 10.00 | 12.50 | 12.50 |
| | Ethyl carbitol acrylate | 2.50 | 2.50 | 2.50 | 2.50 | 13.00 | 13.00 |
| | 4-hydroxybutyl acrylate | 5.00 | 5.00 | 5.00 | 5.00 | 5.00 | 5.00 |
| Photo-polymerization initiators | TPOL | 12.00 | 10.00 | 11.00 | 8.00 | 10.00 | 10.00 |
| | Omnirad 819 | 0.00 | 1.00 | 1.00 | 2.00 | 2.00 | 2.00 |
| | TPO | | | | | | |
| Polymerization inhibitor | UV-5 | 1.00 | 1.00 | 1.00 | 1.00 | 1.00 | 1.00 |
| Surface conditioner | BYK-315N | 0.50 | 0.50 | 0.50 | 0.50 | 0.50 | 0.50 |
| Pigment | P.W.6 | 12.80 | 12.80 | 12.80 | 12.80 | | |
| Pigment dispersant | PB821 | 1.28 | 1.28 | 1.28 | 1.28 | | |
| Total | | 100.00 | | | | | |
| Total amount of photopolymerizable compounds A | | 32.92 | 35.92 | 32.92 | 39.92 | 31.00 | 31.00 |

TABLE 1-continued

| | | | | | | |
|---|---|---|---|---|---|---|
| Total amount of photopolymerizable compounds B | 20.00 | 18.00 | 20.00 | 15.00 | 20.00 | 20.00 |
| Viscosity (mPa · s) | 7.4 | 7.6 | 7.4 | 7.2 | 7.3 | 7.5 |
| Coating film yellowing property | ○ | ○ | ○ | ○ | ○ | ○ |
| Curability | ○ | ○ | ○ | ○ | ○ | ○ |
| Adhesion (PET) | ○ | ○ | ○ | ○ | ○ | ○ |
| Adhesion (PC) | ○ | ○ | ○ | ○ | ○ | ○ |
| Adhesion (PVC) | ○ | ○ | ○ | ○ | ○ | ○ |
| Bending tolerance property | ○ | ○ | ○ | ○ | ○ | ○ |
| Abrasion resistance | ○ | ○ | ○ | ○ | ○ | ○ |
| Water resistance | ○ | ○ | ○ | ○ | ○ | ○ |
| Ethanol resistance | ○ | ○ | ○ | ○ | ○ | ○ |
| Banding resistance | ○ | ○ | ○ | ○ | ○ | ○ |

| | | Comparative Examples | | | | | | |
|---|---|---|---|---|---|---|---|---|
| | | 1 | 2 | 3 | 4 | 5 | 6 | 7 |
| Amine-modified oligomer | CN371 | 2.00 | 2.00 | 2.00 | 2.00 | 2.00 | 2.00 | |
| Photo-polymerizable compounds A | VMOX | | | | | | | |
| | N,N-dimethylacrylamide | 2.50 | 7.50 | 7.50 | 7.50 | 7.50 | 7.50 | 7.50 |
| | Benzyl acrylate | 5.42 | 30.42 | 30.42 | 30.42 | 27.42 | 31.42 | 30.42 |
| | Vinylcaprolactam | | | | | | | |
| Photo-polymerizable compounds B | Hexanediol diacrylate | 30.00 | 12.00 | 16.00 | 19.00 | 15.00 | 15.00 | 17.00 |
| | Isobornyl acrylate | 10.00 | | | | | | |
| Other photo-polymerizable compounds | Acryloylmorpholine | 10.00 | 10.00 | 10.00 | 10.00 | 10.00 | 10.00 | 10.00 |
| | Ethyl carbitol acrylate | 7.50 | 5.50 | 2.50 | 2.50 | 2.50 | 2.50 | 2.50 |
| | 4-hydroxybutyl acrylate | 5.00 | 5.00 | 5.00 | 5.00 | 5.00 | 5.00 | 5.00 |
| Photo-polymerization initiators | TPOL | 12.00 | 12.00 | 7.50 | 6.00 | 15.00 | | 12.00 |
| | Omnirad 819 | 0.00 | 0.00 | 3.50 | 2.00 | 0.00 | 1.00 | 0.00 |
| | TPO | | | | | | 10.00 | |
| Polymerization inhibitor | UV-5 | 1.00 | 1.00 | 1.00 | 1.00 | 1.00 | 1.00 | 1.00 |
| Surface conditioner | BYK-315N | 0.50 | 0.50 | 0.50 | 0.50 | 0.50 | 0.50 | 0.50 |
| Pigment | P.W.6 | 12.80 | 12.80 | 12.80 | 12.80 | 12.80 | 12.80 | 12.80 |
| Pigment dispersant | PB821 | 1.28 | 1.28 | 1.28 | 1.28 | 1.28 | 1.28 | 1.28 |
| Total | | | | | 100.00 | | | |
| Total amount of photopolymerizable compounds A | | 7.92 | 37.92 | 37.92 | 37.92 | 34.92 | 38.92 | 37.92 |
| Total amount of photopolymerizable compounds B | | 40.00 | 12.00 | 16.00 | 19.00 | 15.00 | 15.00 | 17.00 |
| Viscosity (mPa · s) | | 8.6 | 6.4 | 7.5 | 6.5 | 8.7 | 7.0 | 6.3 |
| Coating film yellowing property | | ○ | ○ | X | ○ | Δ | ○ | ○ |
| Curability | | ○ | Δ | ○ | X | ○ | ○ | X |
| Adhesion (PET) | | ○ | ○ | ○ | Δ | ○ | ○ | ○ |
| Adhesion (PC) | | X | ○ | ○ | Δ | ○ | ○ | Δ |
| Adhesion (PVC) | | ○ | ○ | ○ | ○ | ○ | ○ | ○ |
| Bending tolerance property | | ○ | ○ | ○ | ○ | ○ | ○ | Δ |
| Abrasion resistance | | ○ | Δ | ○ | X | Δ | ○ | Δ |
| Water resistance | | ○ | Δ | ○ | Δ | ○ | ○ | ○ |
| Ethanol resistance | | ○ | Δ | ○ | Δ | ○ | ○ | ○ |
| Banding resistance | | ○ | X | Δ | Δ | X | X | Δ |

The photocurable inkjet printing ink compositions of Examples 1 to 6 conforming to the present invention and containing a coloring pigment, prevented yellowing of the coating film, had appropriate viscosities, and achieved excellent effects in terms of curability, adhesion to various types of base materials, bending tolerance property, abrasion resistance, water resistance, ethanol resistance, and banding resistance.

By contrast, the photocurable inkjet printing ink composition of Comparative Example 1 not satisfying requirement A (low total amount of photopolymerizable compounds A) had poor adhesion on the polycarbonate base material, while the photocurable inkjet printing ink composition of Comparative Example 2 not satisfying requirement B (low total amount of photopolymerizable compounds B) exhibited poor curability, abrasion resistance, water resistance, ethanol resistance, and banding resistance.

The photocurable inkjet printing ink composition of Comparative Example 3 not satisfying requirement C in that bis(2,4,6-trimethylbenzoyl)phenylphosphine oxide was blended in excessively, could not prevent yellowing of the coating film and exhibited poor banding resistance.

The photocurable inkjet printing ink composition of Comparative Example 4 not satisfying requirement D in that the content of ethoxy(2,4,6-trimethylbenzoyl)phenylphosphine oxide was low, was inferior in terms of curability, coating film adhesion on base materials, abrasion resistance, water resistance, ethanol resistance, and banding resistance.

The photocurable inkjet printing ink composition of Comparative Example 5 not satisfying requirement D in that the content of ethoxy(2,4,6-trimethylbenzoyl)phenylphosphine oxide was excessive, could not prevent yellowing of the coating film and exhibited poor abrasion resistance and banding resistance.

The photocurable inkjet printing ink composition of Comparative Example 6 not satisfying requirement D in that it did not contain ethoxy(2,4,6-trimethylbenzoyl)phenylphosphine oxide, led to poor banding resistance even though TPO was used.

The photocurable inkjet printing ink composition of Comparative Example 7 not satisfying requirement E in that it did not contain amine-modified oligomer, was inferior in terms of curability, adhesion on some base materials, bending tolerance property, abrasion resistance, and banding resistance.

What is claimed is:

1. A photocurable inkjet printing ink composition, which is a white ink composition or clear ink composition, satisfying all of requirements A to F below:

A: a total content of one or more compounds selected from the group consisting of vinyl methyl oxazolidinone, N,N-dimethylacrylamide, benzyl acrylate, and N-vinylcaprolactam is 30.0% by mass or higher in the photocurable inkjet printing ink composition;

B: a total content of one or more compounds selected from the group consisting of saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition;

C: a content of bis(2,4,6-trimethylbenzoyl)phenylphosphine oxide is more than 0% by mass and 2.5% by mass or lower in the photocurable inkjet printing ink composition;

D: a content of ethoxy(2,4,6-trimethylbenzoyl)phenylphosphine oxide is 6.5 to 13.0% by mass in the photocurable inkjet printing ink composition;

E: a content of amine-modified oligomer is 0.5 to 15.0% by mass in the photocurable inkjet printing ink composition;

F: a content of a white pigment is 17.0% by mass or less in the photocurable inkjet printing ink composition, and no coloring pigment or dye, except for the white pigment in the white ink composition, is contained, wherein a content ratio by mass of ethoxy(2,4,6-trimethylbenzoyl)phenylphosphine oxide to bis(2,4,6-trimethylbenzoyl)phenylphosphine oxide is 3.5 or higher.

2. The photocurable inkjet printing ink composition according to claim 1, containing benzyl acrylate, as the compound specified in requirement A, by 16.0% by mass or more.

3. The photocurable inkjet printing ink composition according to claim 1, further satisfying requirement G below:

G: a brightness of a surface of a photocured coating film prepared using the photocurable inkjet printing ink composition is 7.0 or higher.

4. The photocurable inkjet printing ink composition according to claim 1, further satisfying requirement H below:

H: an optical transmittance of a surface of a photocured coating film prepared using the photocurable inkjet printing ink composition is 70.0% or higher.

5. The photocurable inkjet printing ink composition according to claim 2, further satisfying requirement G below:

G: a brightness of a surface of a photocured coating film prepared using the photocurable inkjet printing ink composition is 7.0 or higher.

6. The photocurable inkjet printing ink composition according to claim 2, further satisfying requirement H below:

H: an optical transmittance of a surface of a photocured coating film prepared using the photocurable inkjet printing ink composition is 70.0% or higher.

7. The photocurable inkjet printing ink composition according to claim 3, further satisfying requirement H below:

H: an optical transmittance of a surface of a photocured coating film prepared using the photocurable inkjet printing ink composition is 70.0% or higher.

8. The photocurable inkjet printing ink composition according to claim 5, further satisfying requirement H below:

H: an optical transmittance of a surface of a photocured coating film prepared using the photocurable inkjet printing ink composition is 70.0% or higher.

9. The photocurable inkjet printing ink composition according to claim 1, wherein the content of bis(2,4,6-trimethylbenzoyl)phenylphosphine oxide, specified in requirement C, is 1% by mass or more and 2.5% by mass or lower.

* * * * *